(12) United States Patent
Zhang (10) Patent No.: US 12,452,562 B1
(45) Date of Patent: Oct. 21, 2025

(54) FAST DCG PIXEL READOUT SCHEME FOR HDR CMOS IMAGE SENSORS

(71) Applicant: Gigajot Technology, Inc., Glendale, CA (US)

(72) Inventor: Dexue Zhang, Arcadia, CA (US)

(73) Assignee: Gigajot Technology, Inc., Glendale, CA (US)

( * ) Notice: Subject to any disclaimer, the term of this patent is extended or adjusted under 35 U.S.C. 154(b) by 138 days.

(21) Appl. No.: 18/324,877

(22) Filed: May 26, 2023

Related U.S. Application Data (60) Provisional application No. 63/346,727, filed on May 27, 2022.

(51) Int. Cl.
  *H04N 25/78* (2023.01)
  *H04N 25/772* (2023.01)

(52) U.S. Cl.
  CPC ......... *H04N 25/78* (2023.01); *H04N 25/772* (2023.01)

(58) Field of Classification Search
  CPC .................. H04N 25/78; H04N 25/772
  See application file for complete search history.

(56) References Cited

U.S. PATENT DOCUMENTS

| 8,059,173 | B2 | 11/2011 | Walschap et al. |
| 9,538,111 | B2 | 1/2017 | Yang et al. |
| 2010/0271517 | A1 | 10/2010 | De Wit et al. |
| 2018/0302578 | A1* | 10/2018 | Ebihara ................ H04N 25/75 |
| 2024/0179434 | A1* | 5/2024 | Han ..................... H04N 25/78 |
| 2024/0196115 | A1* | 6/2024 | Do ..................... H03F 3/45269 |
| 2024/0323570 | A1* | 9/2024 | Oh ..................... H04N 25/7795 |
| 2024/0430587 | A1* | 12/2024 | Lim ..................... H04N 25/709 |

OTHER PUBLICATIONS

Y. Nitta, et al., "High-Speed Digital Double Sampling with Analog CDS on Column Parallel ADS Architecture for Low-Noise Active Pixel Sensor (Abstract Only)", IEEE, 2006 IEEE International Solid State Circuits Conference—Digest of Technical Papers, Feb. 6-9, 2006, Retrieved from https://ieeexplore.ieee.org/abstract/document/1696261, pp. 1-4.

Suho Son, et al., "A one-shot digital correlated double sampling with a differential difference amplifier for a high speed CMOS image sensor (Abstract Only)", 2015 IEEE International Symposium on Circuits and Systems (ISCAS), May 24-27, 2015, pp. 1-4.

* cited by examiner

*Primary Examiner* — Christopher K Peterson
(74) *Attorney, Agent, or Firm* — Robert C. Kowert; Kowert, Hood, Munyon, Rankin & Goetzel, P.C.

(57) ABSTRACT

A dual operation correlated double sampling (CDS) readout circuit for implementation with a dual-conversion-gain (DCG) pixel is disclosed. The dual CDS readout circuit is capable of switching between a first readout mode that implements digital CDS and a second readout mode that implements analog CDS. In various implementations, the dual CDS readout circuit provides digital CDS operations when the DCG pixel outputs a high conversion gain (HCG) analog output signal. The dual CDS readout circuit may provide analog CDS operations when the DCG pixel outputs a low conversion gain (LCG) analog output signal.

20 Claims, 8 Drawing Sheets

FAST DCG PIXEL READOUT SCHEME FOR HDR CMOS IMAGE SENSORS

BACKGROUND

This application claims benefit of priority of U.S. Provisional Application Ser. No. 63/346,727, entitled "Fast DCG Pixel Readout Scheme for HDR CMOS Image Sensors", filed May 27, 2022, which is hereby incorporated in reference herein in its entirety.

TECHNICAL FIELD

This disclosure relates generally to an image sensor and more specifically to design of on-chip circuits for processing signals from the image sensor.

DESCRIPTION OF THE RELATED ART

Image capturing devices, such as cameras, are widely used in various electronic devices, such as mobile devices (e.g., smart phones, tablets, laptops, etc.), robotic equipment, or security monitoring devices, among others. An image capturing device may include an image sensor having a plurality of light-gathering pixels. A pixel may include a photodiode. The image capturing device may capture light from an environment and pass the light to the image sensor. When exposed to light, the photodiodes of the pixels may accumulate photoelectrons. At readout, the photoelectrons may transfer out of the photodiodes and generate analog image signals. Certain image sensors are CMOS image sensors with dual-conversion-gain (DCG) pixels that read out the photoelectron signals from exposure of the photodiodes twice with two different conversion gain signals sequentially-high conversion gain (HCG) and low conversion gain (LCG). These two signals may be processed by various image signal processor circuits that digitize the signals to produce images.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to CMOS (complementary metal-oxide semiconductor) image sensors. In certain embodiments, the CMOS image sensors include dual-conversion-gain (DCG) pixels. DCG pixels are often used for low noise, high dynamic range (HDR) CMOS image sensor devices. A DCG pixel reads out the photoelectron signal from one exposure twice-once with high conversion gain (HCG) and one with low conversion gain (LCG). The HCG and LCG signals may be read out sequentially from the DCG pixel. The DCG pixel includes a DCG gate that switches output of the pixel between the HCG and LCG signals. The DCG gate is coupled to the floating diffusion (FD) node (e.g., FD region) that accumulate charges in the pixel for providing the readout from the pixel. The DCG gate is turned on/off to cycle between the HCG and LCG signals with the DCG gate being off for the HCG signal and on for the LCG signal. Turning on/off the DCG gate turns on/off extra capacitance provided by a capacitor placed between the DCG gate and a reset gate (RG) of the pixel. Accordingly, when the DCG gate is off, the FD has lower capacitance and the HCG signal is read out from the pixel through the FD. Conversely, when the DCG gate is on, the FD has higher capacitance and the LCG signal is read out form the pixel through the FD.

An HCG signal provides lower readout noise but lower full-well capacity because of the limitation from the voltage swing of the FD node. The LCG signal provides larger full-well capacity due to the lowered conversion gain but also higher readout noise. Accordingly, generally the HCG signal is better for providing image signals in low light conditions where there is not much charge accumulated due to low light exposure on the photodiode while the LCG signal is better for providing image signals in high light conditions where there is lots of charge accumulated due to high light exposure on the photodiode. In various embodiments, each DCG pixel produces these two signals for each frame, and a pixel-wise survey is performed during the image reconstruction based on the signal level to choose one signal for the final HDR image. However, because DCG pixels are outputting two readings per pixel (HCG and LCG), image sensors with DCG pixels typically require a higher data throughput rate per image frame than single conversion gain sensors. Conversely, image sensors with DCG pixels will have lower frame rate limits due to the larger amount of readout data for each image frame. Image sensors with DCG pixels also have higher power consumption due to the larger amount of readout data.

Various sampling (e.g., readout) techniques may be implemented to read out analog signal values and convert the analog signal values to digital signal values that are used to produce digital images. One sampling technique is correlated double sampling (CDS) where two sample values are obtained-a reset value and a signal value (e.g., a reset voltage value and a signal voltage value). The reset value is then subtracted from the signal value to generate a final signal value. As used herein, the term "reset value" refers to a value (e.g., a voltage value) read out from a pixel when photoelectrons are not being transferred from the photodiode to the floating diffusion (FD) node. As used herein, the term "signal value" refers to a value (e.g., a voltage value) read out from a pixel when photoelectrons are transferred from the photodiode to the floating diffusion (FD) node (e.g., photoelectrons are released from the photodiode and charge from the photoelectrons is stored in the FD node). Accordingly, subtracting the reset value from the signal value may reduce noise (e.g., fixed pattern noise (FPN)) in the final signal value read out from the pixel.

There are generally two types of CDS techniques-analog CDS and digital CDS. Analog CDS refers to techniques where the subtraction between the reset value and the signal value is achieved in the analog domain. For example, an analog circuit providing sampling/readout of the analog signals from the pixel may perform the subtraction between the reset value and the signal value. Digital CDS refers to techniques where the reset value and the signal value are converted to digital signals (e.g., digital bits) and then the subtraction is performed on the digital values in the digital domain. For example, subtraction by digital CDS may be performed after the analog signals are sampled/readout and converted to digital signals by an analog-to-digital conversion (ADC) circuit. Digital CDS provides an advantage of lower FPN over analog CDS. Digital CDS, however, has slower readout time, limits the frame rate, and has a more complicated readout scheme (which can increase power consumption).

A current challenge is that devices with DCG pixels can implement either digital CDS or analog CDS but not are not capable of providing both. Digital CDS is the most widely adopted sampling technique in devices with DCG pixels, which provides the advantage of lower FPN but sacrifices readout time, frame rate, and readout scheme simplicity. To address these current challenges, the present disclosure contemplates embodiments that are capable of providing both digital CDS and analog CDS utilizing a single readout scheme (e.g., a single sampling circuit provides dual CDS). The disclosed embodiments allow the advantages of both analog CDS and digital CDS to be applied to readouts of DCG pixels. In some embodiments, digital CDS is applied to HCG signals while analog CDS is applied to LCG signals. Various components in the readout scheme (e.g., the readout circuit) may be controlled (e.g., timed) to provide digital CDS when the HCG signal is being output by the pixel and analog CDS when the LCG signal is being output by the pixel. Providing both digital CDS (for the HCG signal) and analog CDS (for the LCG signal) in devices with DCG pixels allows advantages of both sampling techniques to be utilized. Accordingly, the readout scheme of the disclosed embodiments has the advantage of lower FPN for HCG signals provided by digital CDS while also having the advantage of faster frame rate for LCG signals provided by analog CDS (when compared to using only digital CDS for both signals).

Figure 1:
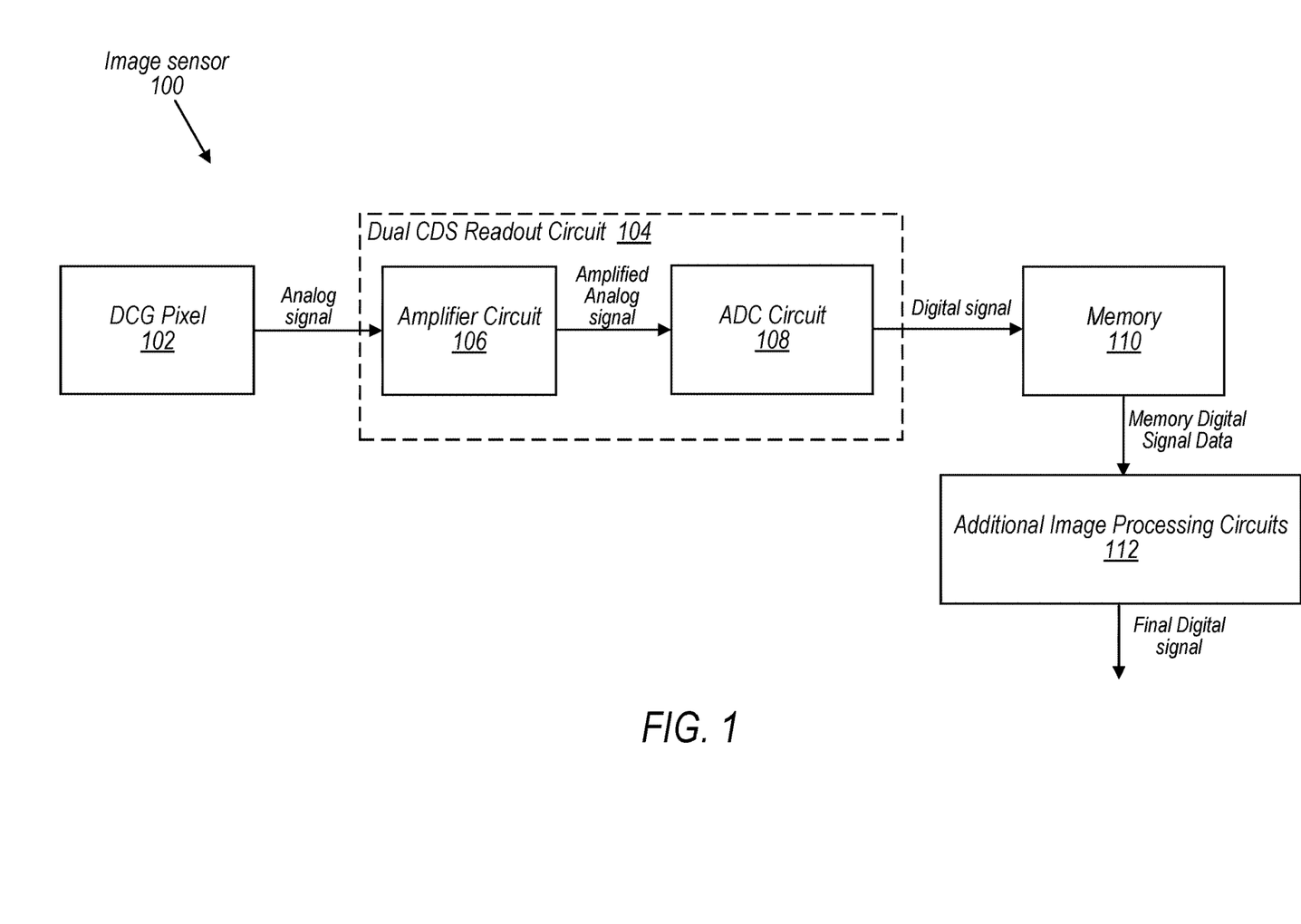
FIG. 1 is a schematic diagram showing an example image signal processing system of an image sensor, according to some embodiments.

FIG. 1 is a schematic diagram showing an example image signal processing system of an image sensor, according to some embodiments. In various embodiments, image sensor 100 is implemented using one or more integrated circuits on a semiconductor die. In some embodiments, image sensor 100 is part of an image capturing device. For example, image sensor 100 may be part of devices including, but not limited to, cameras, mobile devices (e.g., smart phones, tablets, laptops, etc.), robotic equipment, or security monitoring devices.

In the illustrated embodiment, image sensor 100 includes light-gathering DCG (dual-conversion-gain) pixel 102, dual CDS readout circuit 104 having amplifier 106 and analog-to-digital converter (ADC) 108, memory 110, and additional image processing circuits 112. DCG pixel 102, which is described in more detail with respect FIG. 2 below, may include a photodiode and a pixel readout circuit. The photodiode may generate and accumulate photoelectrons when exposed to light. For signal value readout, the photoelectrons may be transferred out of the photodiode and the pixel readout circuit may generate an analog signal output (e.g., an analog voltage output) with the signal value. For reset value readout, photoelectrons may be inhibited from transferring out of the photodiode and the pixel readout circuit may generate an analog signal output (e.g., an analog voltage output) with the reset value. In various embodiments, DCG pixel 102 includes a conversion gain selection circuit. The conversion gain selection circuit switches the analog signal output (which may have either the signal value or the reset value) between a low conversion gain (LCG) analog signal and a high conversion gain (HCG) analog signal. Thus, DCG pixel 102 may provide an analog signal output with either a reset value or a signal value where a high conversion gain or a low conversion gain is applied to the output reset value or signal value.

As shown in FIG. 1, the analog signal output from DCG pixel 102 is provided to amplifier circuit 106 in dual CDS readout circuit 104. It should be noted that while FIG. 1 depicts analog signal output being received in dual CDS readout circuit 104 from a single DCG pixel (e.g., DCG pixel 102), various embodiments may be contemplated where dual CDS readout circuit 104 receives output from multiple DCG pixels. For instance, dual CDS readout circuit 104 may be shared by two or more pixels and receive analog signal output from a multiplexer (MUX) circuit or other circuit that combines the analog signal outputs from the pixels into a single analog signal output. In some embodiments, analog signal outputs processed by multiple dual CDS readout circuits 104 may be combined after conversion of the signals to digital signals. For instance, memory 110 may receive digital signals from two or more dual CDS readout circuits 104 and provide memory digital signal data that is a single digital output for the multiple pixels served by the multiple dual CDS readout circuits 104.

In certain embodiments, as described herein, dual CDS readout circuit 104 operates in two readout modes. In a first readout mode, dual CDS readout circuit 104 may convert both a reset value and a signal value of the analog signal output to digital values. For instance, the reset value may be converted to a digital reset value and the signal value may be converted to a digital signal value. The digital reset value and the digital signal value may be output to memory 110 and converted downstream in the digital domain (e.g., by the memory circuit 110 or additional image processing circuits 112) to a final digital signal value (e.g., by subtracting the digital reset value from the digital signal value as is done with digital CDS). Accordingly, the first readout mode may be a digital CDS mode for dual CDS readout circuit 104 where the subtraction between the reset value and the signal value is completed in the digital domain based on digital values of the reset and signal. In some embodiments, the first readout mode is implemented when DCG pixel 102 is outputting an HCG signal for the analog signal output.

In a second readout mode, dual CDS readout circuit 104 may convert only a signal value of the analog signal output to a digital signal value. The digital signal value output by dual CDS readout circuit 104 in the second readout mode may be a difference between the reset value of the analog signal output and the signal value of the analog signal output determined by analog circuits within dual CDS readout circuit 104. For instance, the digital signal value output in the second readout mode may be a change in the analog signal output from the reset value to the signal value. Accordingly, the second readout mode may be an analog CDS mode for dual CDS readout circuit 104 where the subtraction between the reset value and the signal value is completed in the analog domain. In some embodiments, the second readout mode is implemented when DCG pixel 102 is outputting an LCG signal for the analog signal output.

Figure 2:
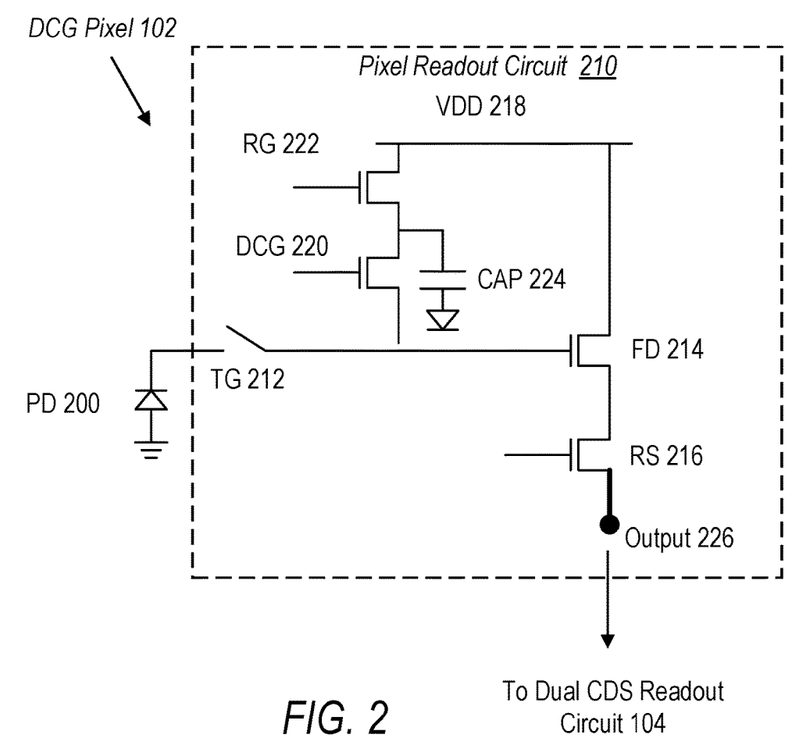
FIG. 2 is a schematic diagram of an example DCG (dual conversion gain) pixel according to some embodiments.

FIGS. 2-5 provide further details on the schematics of DCG pixel 102, dual CDS readout circuit 104 (including amplifier circuit 106 and ADC circuit 108), and memory circuit 110 and their functions in the operation of image sensor 100. FIG. 2 is a schematic diagram of an example DCG pixel 102, according to some embodiments. In the illustrated embodiment, DCG pixel 102 includes photodiode (PD) 200 and pixel readout circuit 210. In certain embodiments, readout circuit 210 includes transfer gate (TG) transistor 212 (which may be a switch, as shown in FIG. 2), floating diffusion (FD) node 214, row selection (RS) gate transistor 216, reset voltage (VDD) 218, dual conversion gate (DCG) transistor 220, reset gate (RG) transistor 222, capacitor (CAP) 224, and output 226.

In various embodiments, TG 212 may be placed in DCG pixel 102 to switch between modes of maintaining photoelectrons in PD 200 (e.g., allowing accumulation of photoelectrons in the photodiode) and releasing (e.g., transferring) photoelectrons from PD 200 to FD 214. For example, at readout, TG 212 is turned on to couple PD 200 with FD 214 and the photoelectrons may transfer from the PD 200 to the FD 214. FD 214 may have capacitance and the transfer of photoelectrons into FD 214 causes a current to flow through the capacitance and generate an analog voltage. Output 226 is coupled to FD 214 through RS 216, which turns on/off the output 226 based on row selection (e.g., under control signals from a row logic circuit). The voltage of FD 214 may be accessed and sampled through output 226 (e.g., by dual CDS readout circuit 104) when RS 216 is turned on.

In the illustrated embodiment, the capacitance of FD 214 is determined by the operation of DCG 220 in combination with capacitor 224. When DCG 220 is turned on, capacitor 224 increases the capacitance of FD 214 and drops the conversion gain in FD 214 for operation in the LCG (low conversion gain) mode of pixel readout circuit 210 and DCG pixel 102. When DCG 220 is turned off, capacitor 224 is not coupled to FD 214 and the capacitance is thus lower such that the conversion gain in FD 214 is higher for operation in HCG (high conversion gain) mode of pixel readout circuit 210 and DCG pixel 102. RG 222 is used to turn on/off a reset mode for pixel readout circuit 210 during LCG operation. For instance, turning RG 222 on with DCG 220 turned on resets FD to VDD 218. The various operations of gates/transistors in pixel readout circuit 210 may be controlled by a row logic circuit or other external circuit coupled to DCG pixel 102.

Figure 3:
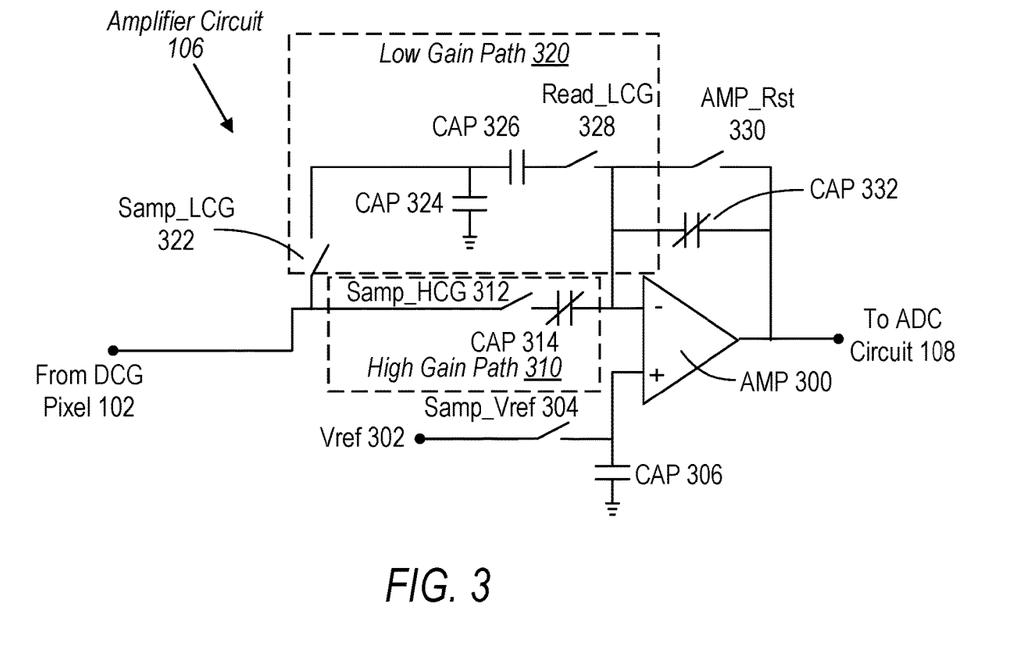
FIG. 3 is a schematic diagram of an example amplifier circuit of a dual CDS (correlated double sampling) readout circuit, according to some embodiments.

FIG. 3 is a schematic diagram of an example amplifier circuit 106 of dual CDS readout circuit 104, according to some embodiments. In the illustrated embodiment, amplifier circuit 106 includes amplifier (AMP) 300, amplifier voltage reference (Vref) 302, Vref sample switch (Samp_Vref) 304, capacitor (CAP) 306, two gain paths (dashed boxes)—high gain path 310 and low gain path 320, amplifier reset switch (AMP_Rst) 330, and capacitor (CAP) 332. High gain path 310 includes HCG sample switch (Samp_HCG) 312 and capacitor (CAP) 314. Low gain path 320 includes LCG sample switch (Samp_LCG) 322, capacitor (CAP) 324, capacitor (CAP) 326, and LCG read switch (Read_LCG) 328.

In various embodiments, amplifier circuit 106 is capable of switching (e.g., via turning on/off combinations of the depicted switches) an incoming analog signal received from DCG pixel 102 between high gain path 310 and low gain path 320. Amplifier 300 may be, for example, a programmable-gain amplifier (PGA) that has a gain controlled, at least in part, by a value of Vref 302 in combination with a value of capacitor 332 relative to capacitor 314 or capacitor 326 depending on whether high gain path 310 or low gain path 320, respectively, is turned on. For instance, when utilizing high gain path 310, the gain is determined, at least in part, by the ratio between capacitor 314 and capacitor 332 in combination with Vref 302 while when utilizing low gain path 320, the gain is determined, at least in part, by the ratio between capacitor 326 and capacitor 332 in combination with Vref 302. Examples of the changes in gains are described in further detail with respect to the timing operation of DCG pixel 102 and dual CDS readout circuit 104 described below. The timing operation described herein also describes various operations of the transistors/switches in amplifier circuit 106. In various embodiments, capacitor 306 is a feedback capacitor for amplifier 300 where access to feedback is controlled the switch Samp_Vref 304. Capacitor 324 provides feedback on a reset level for low gain path 320 when switch Samp_LCG 322 and switch Read_LCG are turned off, as further described herein.

Figure 4:
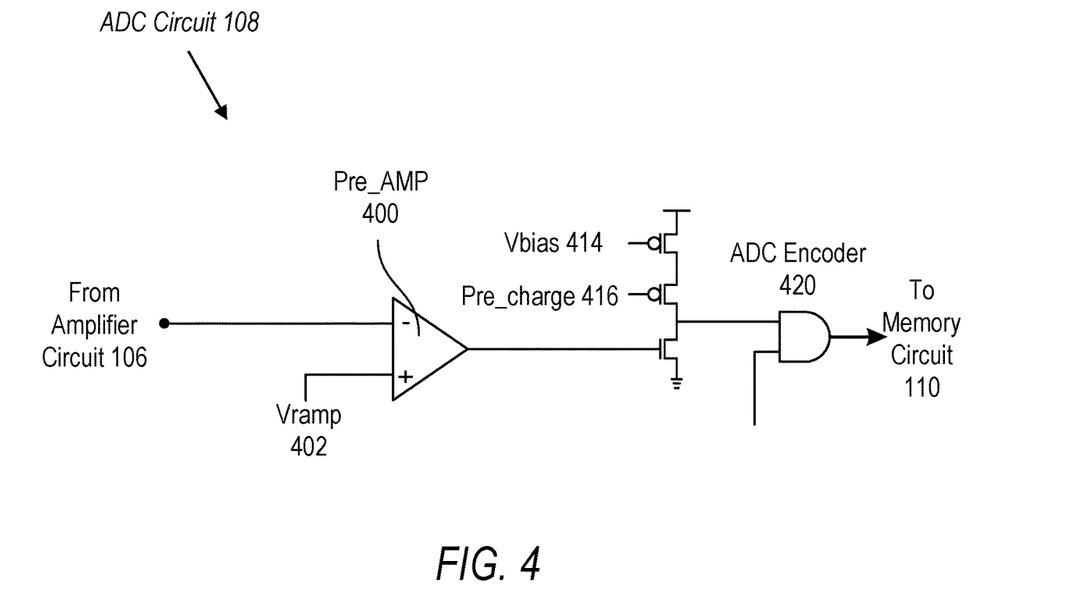
FIG. 4 is a schematic diagram of an example ADC circuit of a dual CDS readout circuit, according to some embodiments.

FIG. 4 is a schematic diagram of an example ADC circuit 108 of dual CDS readout circuit 104, according to some embodiments. In the illustrated embodiment, ADC circuit 108 includes pre-amplifier (Pre_AMP) 400 with a voltage ramp input (Vramp) 402, bias voltage transistor (Vbias) 414, pre-charge transistor (Pre_charge) 416, and ADC encoder 420. Pre-amplifier 400 may provide a voltage ramp (determined by voltage ramp input 402) to ramp up and start the counting with ADC encoder 420. With the voltage ramp, ADC circuit 108 operates to convert analog signals from DCG pixel 102 amplified by amplifier circuit 106 to digital signals that can be stored in memory circuit 110 or otherwise processed downstream of dual CDS readout circuit 104. The operation of the various transistors of ADC circuit 108 are described further with respect to the timing operation of DCG pixel 102 and dual CDS readout circuit 104 described below. It should be noted that while FIGS. 3 and 4 illustrate the various components of dual CDS readout circuit 104 separated into amplifier circuit 106 and ADC circuit 108 that embodiments may be contemplated where the components of amplifier circuit 106 and ADC circuit 108 are combined into a single circuit that is not readily differentiated into an amplifier circuit and an ADC circuit or various components from one circuit are implemented in another circuit.

Figure 5:
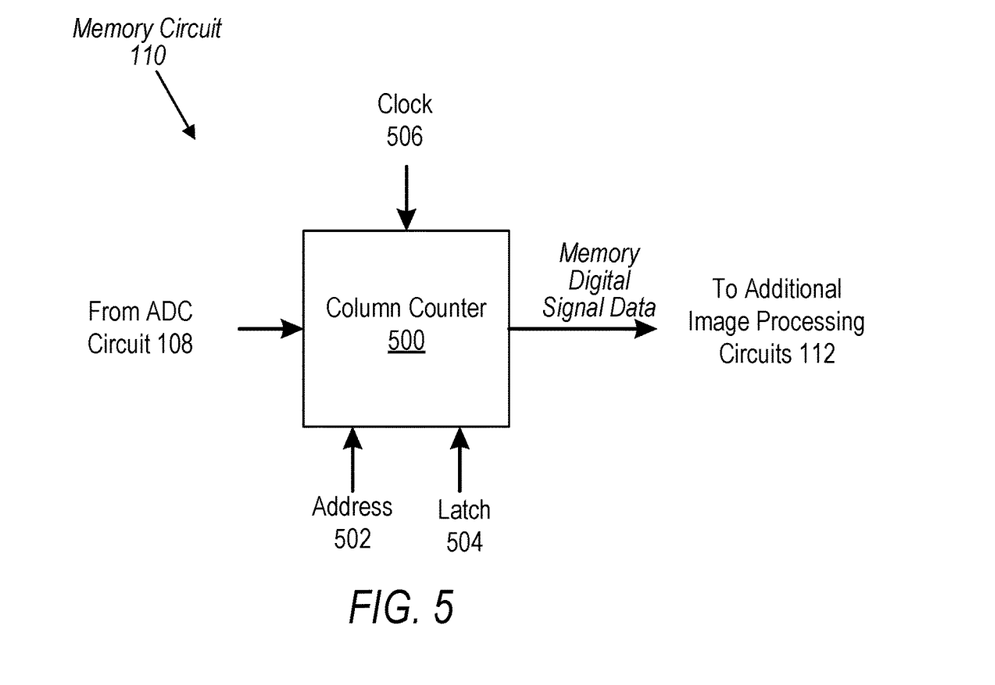
FIG. 5 is a schematic diagram of an example memory circuit, according to some embodiments.

FIG. 5 is a schematic diagram of an example memory circuit 110, according to some embodiments. In the illustrated embodiment, memory circuit 110 includes column counter 500. Column counter 500 may be, for example, a SRAM column counter with two memory banks for storing 2 bits of digital data. Having a 2 bit storage capacity allows column counter 500 to store both reset and signal digital values of data from DCG pixel 102 (e.g., the digital reset value and the digital signal value for the HCG analog signal). Inputs to column counter 500 include address 502, latch 504, and clock 506. Data stored in column counter 500 may be output as memory digital signal data to various additional image processing circuits 112, described herein.

Figure 6:
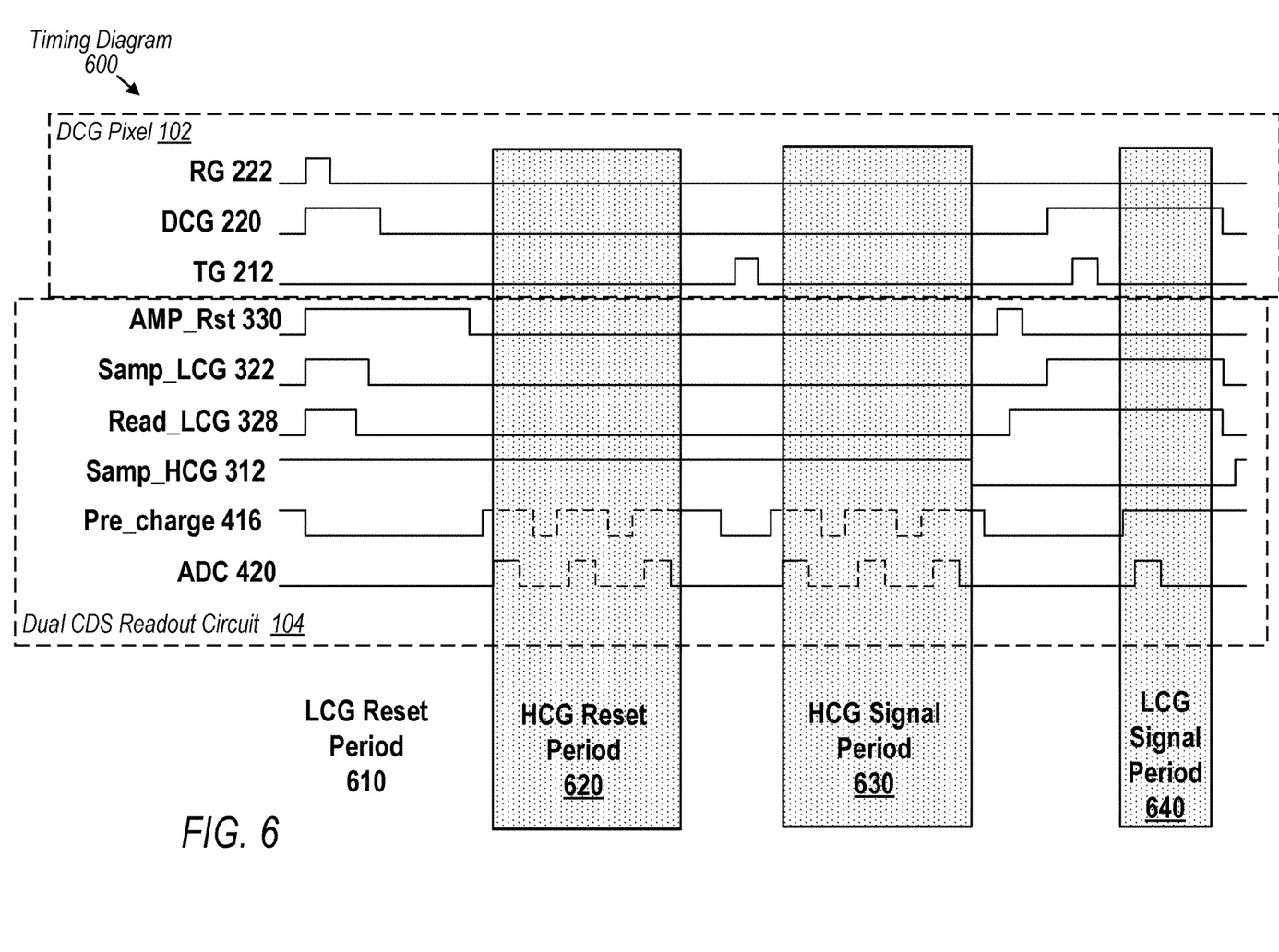
FIG. 6 depicts a timing diagram for various components of a DCG pixel and a dual CDS readout circuit, according to some embodiments.

FIG. 6 depicts a timing diagram for various components of DCG pixel 102 and dual CDS readout circuit 104, according to some embodiments. In the illustrated embodiment, timing diagram 600 includes timing for RG 222, DCG 220, and TG 212 in DCG pixel 102. Additionally, timing diagram 600 includes timing for amplifier reset switch (AMP_Rst) 330, LCG sample switch (Samp_LCG) 322, LCG read switch (Read_LCG) 328, HCG sample switch (Samp_HCG) 312, pre-charge transistor (Pre_charge) 416, and ADC encoder 420 in dual CDS readout circuit 104. In various embodiments, timing diagram 600 follows a conventional sequence for a readout from a DCG pixel—e.g., a readout sequence of LCG reset-HCG reset-HCG signal-LCG signal.

While a conventional sequence for the readout from DCG pixel 102 is provided, the timing of the various circuits shown in the timing diagram 600, in combination with the circuit schematics of dual CDS readout circuit 104, provide a sampling (e.g., readout) technique that combines the advantages of both digital and analog CDS in a single readout schematic. For instance, timing diagram 600, in combination with the circuit schematics of dual CDS readout circuit 104, provides a sampling technique that has a lower FPN than if only analog CDS is implemented and a higher frame rate than if only digital CDS is implemented. For instance, timing diagram 600, in combination with the circuit schematics of dual CDS readout circuit 104, takes advantage of the low FPN (fixed pattern noise) of digital CDS by implementing digital CDS when the HCG analog signal output is received from DCG pixel 102 in combination taking advantage of the high frame rate of analog CDS by implementing analog CDS when the LCG analog signal output is received from DCG pixel 102.

Timing diagram 600 begins with LCG reset period 610 on the left hand side of the diagram. LCG reset period 610 begins with turning off pre-charge transistor 416 (which may be on from the end of a previous LCG signal conversion cycle). After pre-charge transistor 416 is turned off, all of RG 222, DCG 220, amplifier reset switch 330, LCG sample switch 322, LCG read switch 328, and HCG sample switch 312 are turned on. Note that HCG sample switch 312 may also be turned on while pre-charge transistor 416 is still on, as shown in FIG. 6. RG 222 is pulsed at the beginning of LCG reset period 610 to reset FD 214 (shown in FIG. 1) to its LCG reset value while DCG 220 remains turned on to keep DCG pixel 102 in LCG mode.

In certain embodiments, after RG 222 is turned off and while DCG 220 and amplifier reset switch 330 remain on, LCG sample switch 322 and LCG read switch 328 are turned off and a sample of the LCG reset value is obtained (e.g., a sample value is obtained via capacitor 324 in low gain path 320, shown in FIG. 3). The LCG reset value sampled corresponds to a value of the voltage of FD 214 (shown in FIG. 1) when DCG 220 is on and has been reset by the pulsing of RG 222. Note that this sample of the LCG reset value does not include any conversion of the reset value of the analog signal output to a digital reset value.

After sampling of the LCG reset value, DCG 220 is turned off to end LCG reset period 610. After LCG reset period 610 ends, amplifier reset switch 330 remains on for a short period to reset amplifier 300 (shown in FIG. 3). Since DCG 220 has been turned off, DCG pixel 102 is now in HCG mode and the transition to HCG reset period 620 may begin. The transition to HCG reset period 620 may also include turning off amplifier reset switch 330 to release amplifier 300 from the reset, as shown in timing diagram 600. A period of time after turning off amplifier reset switch 330 is provided to allow the output of amplifier 300 to settle.

HCG reset period 620 then includes sampling of the HCG reset value through amplifier circuit 106 and ADC circuit 108 by turning on/off pre-charge transistor 416 and ADC encoder 420 at least once. In certain embodiments, sampling of the HCG reset value is performed multiple times to get correlated multiple sampling (CMS) of the HCG reset value. The number of times for sampling may be a predetermined number based on the requirements of the CMS employed in image sensor 100. Multiple sampling is performed by pulsing (e.g., turning on/off) pre-charge transistor 416 and ADC encoder 420 multiple times, as shown in FIG. 6. While ADC encoder 420 is turned on, the ADC encoder outputs the digital value conversion of the analog HCG reset value to memory circuit 110 (shown in FIGS. 1 and 5). Performing CMS may reduce noise levels in the digital value of the HCG reset determined by dual CDS readout circuit 104. Noise reduction may be implemented by various algorithms implemented at memory circuit 110 or in downstream processing in additional image processing circuits 112.

Once the HCG reset value is sampled the predetermined number of times, pre-charge transistor 416 and ADC encoder 420 are turned off and TG 212 in DCG pixel 102 is pulsed on for a predetermined time period. Turning on TG 212 allows all or part of the photoelectrons accumulated in PD 200 to be transferred to FD 214 (as shown in FIG. 2). Once FD 214 is charged and the output of amplifier 300 settles, HCG signal period 630 begins. During HCG signal period 630, pre-charge transistor 416 and ADC encoder 420 are pulsed (e.g., turned on/off) a predetermined number of times for CMS of the signal value of HCG analog signal output. During HCG signal period 630, ADC encoder 420 outputs the digital value conversion of the analog HCG signal value to memory circuit 110 (shown in FIGS. 1 and 5).

It should be noted that during both HCG reset period 620 and HCG signal period 630, LCG sample switch 322 is turned off. Accordingly, high gain path 310 with HCG sample switch 312 and capacitor 314 is utilized in amplifier circuit 106, as shown in FIG. 3. With the implementation of high gain path 310, the gain provided by amplifier 300 is determined by the ratio of capacitor 332 to capacitor 314. In certain embodiments, the gain implemented with high gain path 310 is greater than 1 (e.g., 2, 4, 6, or higher). With the output of HCG reset period 620 and HCG signal period 630 being conversions of the HCG analog signal outputs to digital outputs (e.g., the output of a digital reset value and a signal reset value from the analog HCG reset value and signal value, respectively), a digital CDs technique for sampling of the readout from DCG pixel 102 has been implemented using dual CDS readout circuit 104. The digital reset value and the digital signal value output by dual CDS readout circuit 104 may be later processed through known digital subtraction techniques (e.g., calculations performed by additional image processing circuits 112) to reduce FPN noise in the HCG values.

At the end of HCG signal period 630, HCG sample switch 312 is turned off, as shown in timing diagram 600 in FIG. 6. With HCG sample switch 312 turned off, high gain path 310 in amplifier circuit 106 is also turned off. After HCG signal period 630, a transition to LCG signal period 640 begins with resetting amplifier 300 by pulsing amplifier reset switch 330. As amplifier reset switch 330 is being turned off, LCG read switch 328 may be turned on (e.g., LCG read switch 328 is turned on slightly before amplifier reset switch 330 is turned off). LCG read switch 328 may be turned on to configure amplifier in the LCG gain mode with a gain determined by the ratio between capacitor 332 and capacitor 326. In certain embodiments, the gain in LCG gain mode is 1. Having a gain of 1 for the LCG gain mode may remove a need to create a ramp down, ramp generator for the analog-to-digital conversion. After amplifier reset switch 330 is turned off, DCG 220 and LCG sample switch 322 may be turned on to connect output 226 from DCG pixel 102 to low gain path 320, as shown in FIG. 3, with the LCG analog signal output being provided to the input of amplifier 300 (since amplifier reset switch 330 is now turned off). Accordingly, with DCG 220 on, low gain path 320 is utilized to amplify the LCG analog signal output and provide the output to ADC circuit 108.

With DCG 220 and LCG sample switch 322 turned on, TG 212 is pulsed on for a predetermined time period to begin LCG signal period 640. Turning on TG 212 with DCG 220 on allows any photoelectrons remaining in PD 200 after the previous pulse with DCG 220 off to be transferred to FD 214 (as shown in FIG. 2) and generate LCG analog signal output. The extra capacitance provided by turning DCG 220 on may enable the remaining accumulated charge to be released from PD 200. In some instances, however, there may be little to no photoelectrons left in PD 200 after the previous pulse during HCG analog signal output, in which case, the LCG analog signal output will be relatively small. When there are remaining photoelectrons, the LCG analog signal output is processed by dual CDS readout circuit 104 to convert the analog signal value to a digital signal value by the pulsing of pre-charge transistor 416 and ADC encoder 420. As the LCG analog signal output of a reset value was already processed by dual CDS readout circuit 104 during LCG reset period 610, the signal value obtained during LCG signal period 640 represents the absolute difference between the reset value and signal value of the LCG analog signal output. As such, the LCG digital signal value output by ADC circuit 108 corresponds to a signal value that has had the reset value subtracted in the analog domain (e.g., the analog circuit domain of dual CDS readout circuit 104). With this analog domain subtraction, only a single conversion of the LCG analog signal value is needed to get the LCG digital signal value since there is no analog-to-digital conversion of the LCG analog reset value. With only the single conversion of the LCG analog signal value being needed, the sampling technique implemented by dual CDS readout circuit 104 using timing diagram 600 performs only three overall analog-to-digital conversions, which improves frame rate over operating digital CDS for both HCG and LCG readouts that would require four analog-to-digital conversions.

As described herein, dual CDS readout circuit 104 implements digital CDS for HCG analog signal outputs and analog CDS for LCG analog signal outputs. Accordingly, dual CDS readout circuit 104, utilizing the timing shown in timing diagram 600, provides a sampling technique that implements either digital CDS or analog CDS for situations in which the specified CDS technique provides distinct advantages. For instance, utilizing digital CDS for HCG analog signal outputs from DCG pixel 102 may be useful when DCG pixel 102 captures image data for low light conditions where reducing noise (e.g., reduced FPN) is needed. Meanwhile, utilizing analog CDS for LCG analog signal outputs is useful to improve frame rate when DCG pixel 102 captures image data for high light conditions where shot noise is not necessarily an issue. Accordingly, dual CDS readout circuit 104 implements a sampling technique that combines the advantages of digital CDS by lowering FPN and the advantages of analog CDS by providing faster readout and improved frame rate for processing analog output signals received from a DCG pixel.

In various embodiments, additional image processing techniques may be implemented to decide whether the digital readout of the HCG analog signal output (processed by digital CDS) or the digital readout of the LCG analog signal output (processed by analog CDS) is utilized for a specific DCG pixel when an image is captured and processed to create a digital image. The decision whether to use the digital readout of the HCG analog signal output or the digital readout of the LCG analog signal output may be determined on a pixel-by-pixel, row-by-row, or column-by-column basis, which may depend on the image being captured or the operating parameters of image sensor 100.

Figure 7:
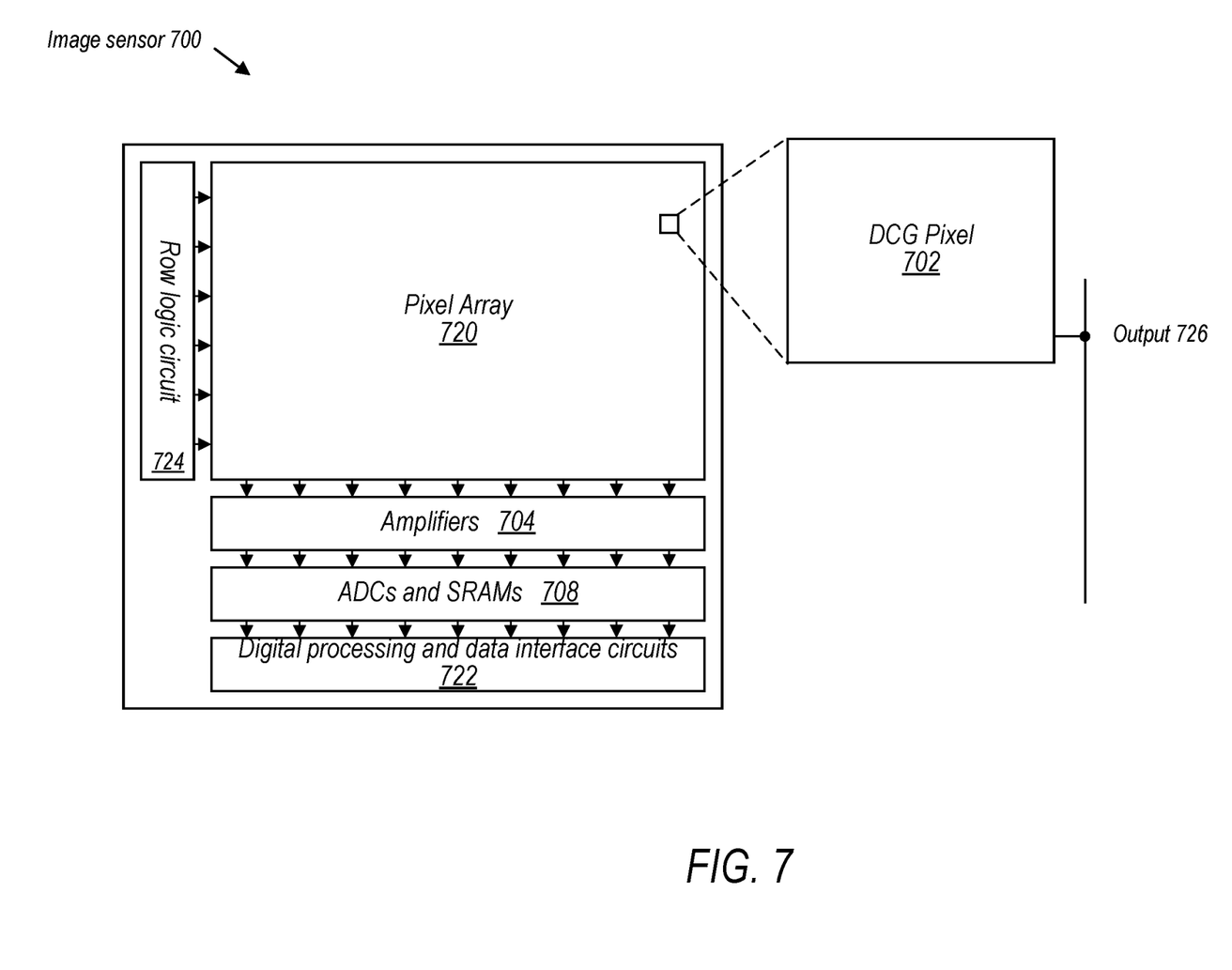
FIG. 7 is a schematic diagram of an example image sensor including the above described dual CDS readout circuit, according to some embodiments.

FIG. 7 is a schematic diagram of an example image sensor including the above described dual CDS readout circuit, according to some embodiments. As shown in FIG. 7, image sensor 700 may include a plurality of light-gathering pixels 702 (e.g., similar to DCG pixel 102) organized as a pixel array 720. In some embodiments, image sensor 700 may include one or more amplifiers 704 (e.g., similar to amplifier circuit 106 of FIGS. 1 and 3), one or more ADC circuits and memory 708 (e.g., similar to ADC circuit 108 and memory circuit 110 of FIGS. 1, 4, and 5), and one or more image signal processing and data interface circuits 722 (e.g., including additional image processing circuits 112, shown in FIG. 1). As described above, in some embodiments, image signals of pixels 702 of pixel array 720 may be read out row-by-row or column-by-column (or even pixel-by-pixel). For purposes of illustration, in this example, image sensor 700 may also include row logic circuit 724 to provide control signals to perform row-by-row readout of pixels 702. Using the row-by-row readout, pixels 702 on the same row may be read out at or around the same time, whereas pixels 702 on the same column but different rows may be read out sequentially one row after another.

In some embodiments, the above readout of image signals of pixels 702 may be implemented using one or more readout circuits (e.g., dual CDS readout circuits 104, shown in FIG. 1). For example, as described herein (and shown by example in FIG. 2), at least some of pixels 702 (e.g., DCG pixel 102) may each include a photodiode and a pixel readout circuit. The photodiode may generate and accumulate photoelectrons when exposed to light. During readout, under control signals from row logic circuit 724, a row selection transistor (e.g., RS 216, shown in FIG. 2) may be turned on and release analog signal output through output 726 (similar to output 226 in FIG. 2). Output 726 may be coupled to a floating diffusion node (such as FD 214) that, depending on the state of a transfer gate (such as TG 212) may output an analog output signal with a reset value or a signal value. These operations may be repeated on different pixels, e.g., according to the rows or columns.

Figure 8:
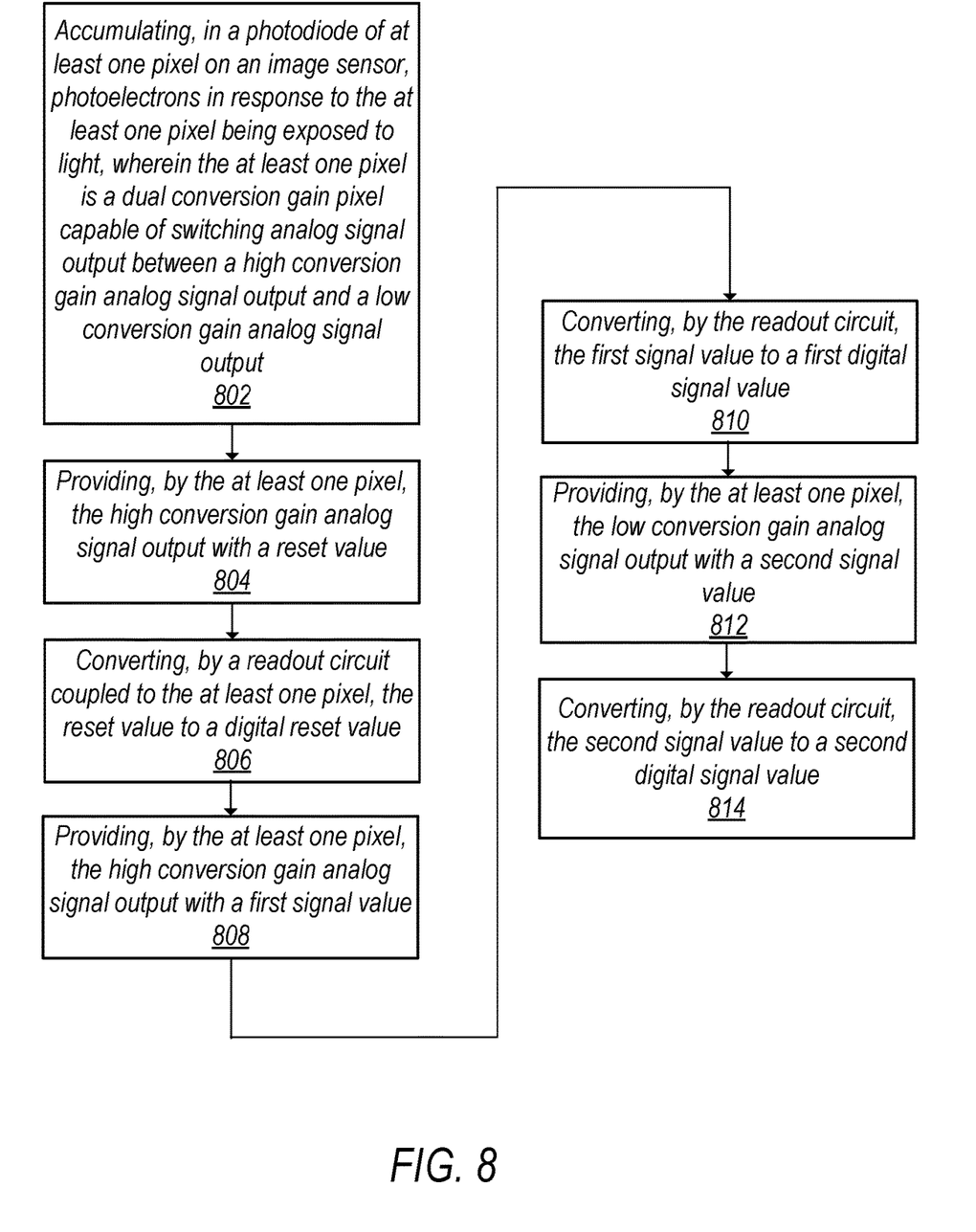
FIG. 8 is a flowchart showing an example method for processing image signals of an image sensor, according to some embodiments.

FIG. 8 is a flowchart showing an example method for processing image signals of an image sensor, according to some embodiments. In FIG. 8, in some embodiments, in a photodiode of at least one pixel on an image sensor, photoelectrons are accumulated in response to the at least one pixel being exposed to light where the at least one pixel is a dual conversion gain pixel capable of switching analog signal output between a high conversion gain analog signal output and a low conversion gain analog signal output, as shown by block 802. During readout, these photoelectrons may transfer out of the photodiodes to generate analog signal outputs (e.g., analog voltage outputs) at FD regions of the pixels, which may be further accessed at the output of the pixels. In FIG. 8, in some embodiments, the at least one pixel provides the high conversion gain analog signal output with a reset value at block 804. At block 806, the reset value is converted to a digital reset value by a readout circuit (e.g., dual CDS readout circuit 104) coupled to the at least one pixel. Further, at block 808, the at least one pixel provides the high conversion gain analog signal output with a first signal value. The readout circuit converts the first signal value to a first digital signal value at block 810. Then, at block 812, the at least one pixel provides the low conversion gain analog signal output with a second signal value. At block 814, the readout circuit converts the second signal value to a second digital signal value. In various embodiments, the readout circuit is configured to operate in a first readout mode when the output of the at least one pixel circuit is the high conversion gain analog signal and operate in a second readout mode when the output of the at least one pixel circuit is the low conversion gain analog signal.

Figure 9:
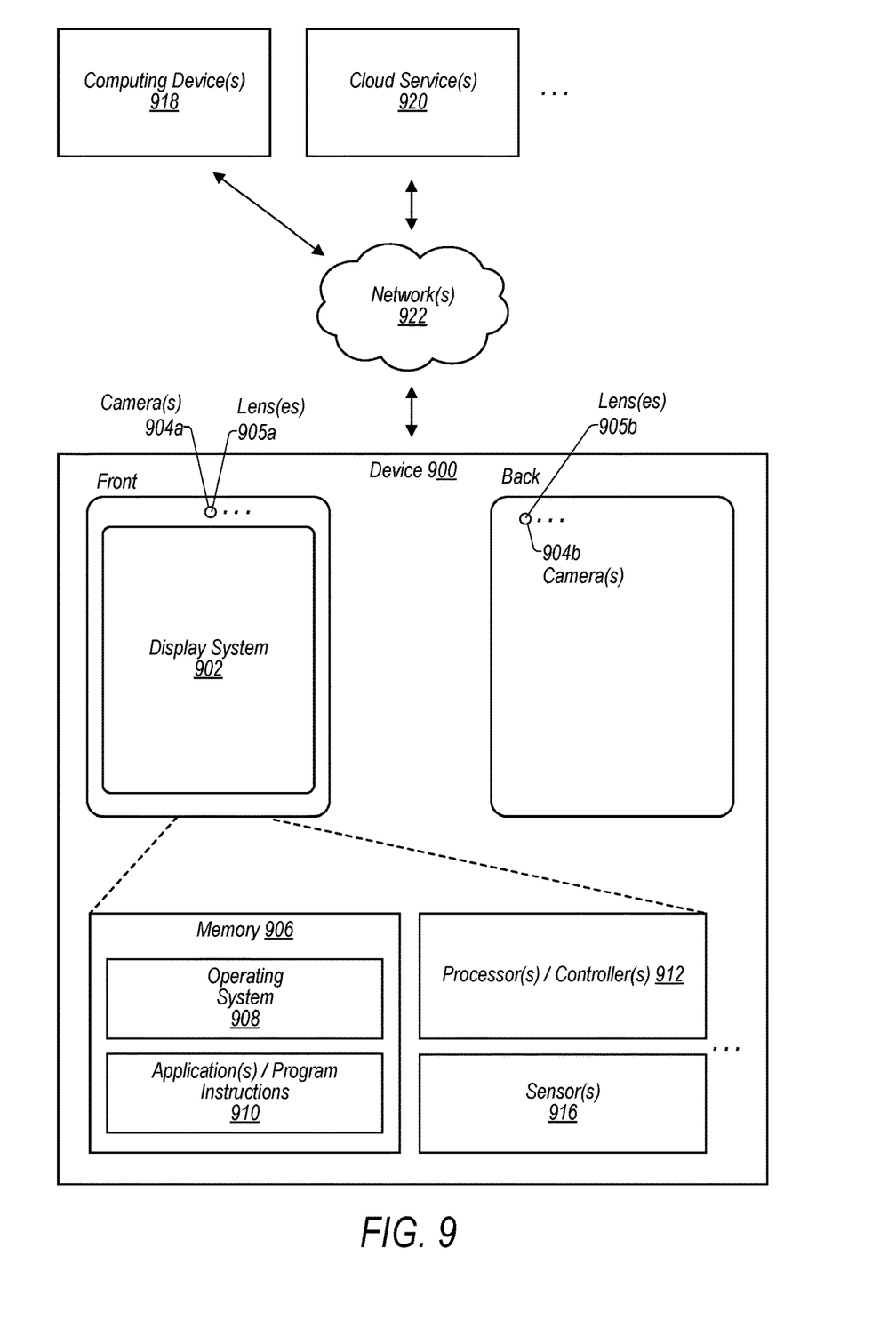
FIG. 9 illustrates a schematic representation of an example device that may include an image capturing device (e.g., a camera) having an image sensor, according to some embodiments.

FIG. 9 illustrates a schematic representation of an example device 900 that may include an image capturing device (e.g., a camera) having an image sensor, according to some embodiments. In some embodiments, the device 900 may be a mobile device and/or a multifunction device. In various embodiments, the device 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 900 may include a display system 902 (e.g., comprising a display and/or a touch-sensitive surface) and/or one or more cameras 904. In some non-limiting embodiments, the display system 902 and/or one or more front-facing cameras 904a may be provided at a front side of the device 900, e.g., as indicated in FIG. 9. Additionally, or alternatively, one or more rear-facing cameras 904b may be provided at a rear side of the device 900. In some embodiments comprising multiple cameras 904, some or all of the cameras may be the same as, or similar to, each other. Additionally, or alternatively, some or all of the cameras may be different from each other. In various embodiments, the location(s) and/or arrangement(s) of the camera(s) 904 may be different than those indicated in FIG. 9. In various embodiments, cameras 904 include lens(es) 905. Image sensors (e.g., image sensor 100) may receive light that passes through lens(es) 905 to reach the image sensors.

Among other things, the device 900 may include memory 906 (e.g., comprising an operating system 908 and/or application(s)/program instructions 910), one or more processors and/or controllers 912 (e.g., comprising CPU(s), memory controller(s), display controller(s), and/or camera controller(s), etc.), and/or one or more sensors 916 (e.g., orientation sensor(s), proximity sensor(s), and/or position sensor(s), etc.). In some embodiments, the device 900 may communicate with one or more other devices and/or services, such as computing device(s) 918, cloud service(s) 920, etc., via one or more networks 922. For example, the device 900 may include a network interface that enables the device 900 to transmit data to, and receive data from, the network(s) 922. Additionally, or alternatively, the device 900 may be capable of communicating with other devices via wireless communication using any of a variety of communications standards, protocols, and/or technologies.

Figure 10:
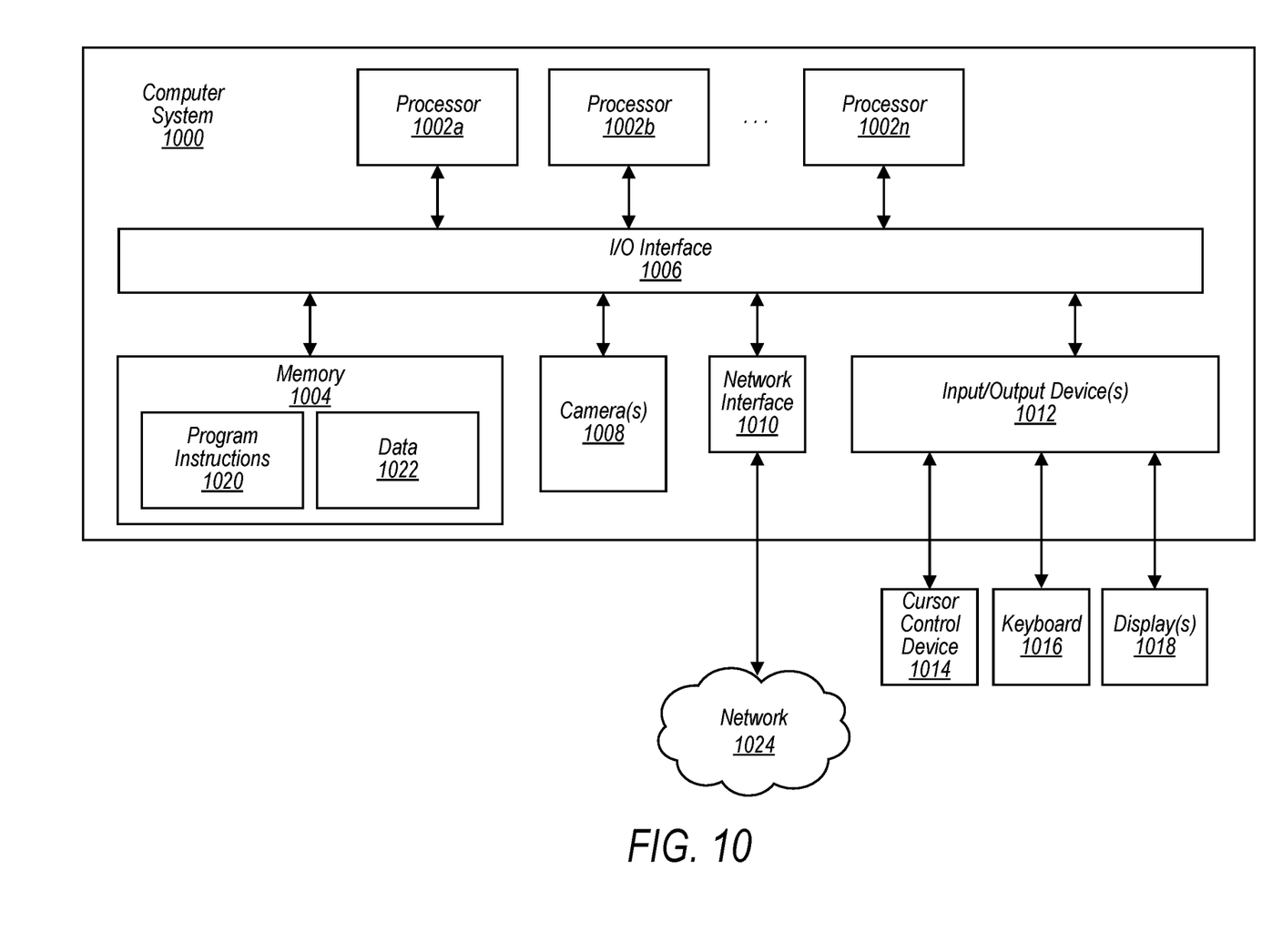
FIG. 10 illustrates a schematic block diagram of an example computing device that may include or host embodiments of an image capturing device (e.g., a camera) having an image sensor, according to some embodiments.

FIG. 10 illustrates a schematic block diagram of an example computing device, referred to as computer system 1000, that may include or host embodiments of an image capturing device (e.g., a camera) having an image sensor, according to some embodiments. In addition, computer system 1000 may implement methods for controlling operations of the camera and/or for performing image processing images captured with the camera. In some embodiments, the device 1000 (described herein with reference to FIG. 10) may additionally, or alternatively, include some or all of the functional components of the computer system 1000 described herein.

The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1000 includes one or more processors 1002 coupled to a system memory 1004 via an input/output (I/O) interface 1006. Computer system 1000 further includes one or more cameras 1008 coupled to the I/O interface 1006. Computer system 1000 further includes a network interface 1010 coupled to I/O interface 1006, and one or more input/output devices 1012, such as cursor control device 1014, keyboard 1016, and display(s) 1018. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1002, or a multiprocessor system including several processors 1002 (e.g., two, four, eight, or another suitable number). Processors 1002 may be any suitable processor capable of executing instructions. For example, in various embodiments processors 1002 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1002 may include additional types of processors, such as graphics processing units (GPUs), application specific integrated circuits (ASICs), etc. In multiprocessor systems, each of processors 1002 may commonly, but not necessarily, implement the same ISA. In some embodiments, computer system 1000 may be implemented as a system on a chip (SoC). For example, in some embodiments, processors 1002, memory 1004, I/O interface 1006 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1004 may be configured to store program instructions 1020 accessible by processor 1002. In various embodiments, system memory 1004 may be implemented using any suitable memory technology, such as static random access memory (SRAM), synchronous dynamic RAM (SDRAM), nonvolatile/Flash-type memory, or any other type of memory. Additionally, existing camera control data 1022 of memory 1004 may include any of the information or data structures to implement the techniques described above. In some embodiments, program instructions 1020 and/or data 1022 may be received, sent or stored upon different types of computer-accessible media or on similar media separate from system memory 1004 or computer system 1000. In various embodiments, some or all of the functionality described herein may be implemented via such a computer system 1000.

In one embodiment, I/O interface 1006 may be configured to coordinate I/O traffic between processor 1002, system memory 1004, and any peripheral devices in the device, including network interface 1010 or other peripheral interfaces, such as input/output devices 1012. In some embodiments, I/O interface 1006 may perform any necessary protocol, timing or other data transformations to convert data signals from one component (e.g., system memory 1004) into a format suitable for use by another component (e.g., processor 1002). In some embodiments, I/O interface 1006 may include support for devices attached through various types of peripheral buses, such as a variant of the Peripheral Component Interconnect (PCI) bus standard or the Universal Serial Bus (USB) standard, for example. In some embodiments, the function of I/O interface 1006 may be split into two or more separate components, such as a north bridge and a south bridge, for example. Also, in some embodiments some or all of the functionality of I/O interface 1006, such as an interface to system memory 1004, may be incorporated directly into processor 1002.

Network interface 1010 may be configured to allow data to be exchanged between computer system 1000 and other devices attached to a network 1024 (e.g., carrier or agent devices) or between nodes of computer system 1000. Network 1024 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1010 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1012 may, in some embodiments, include one or more display terminals, keyboards, keypads, touchpads, scanning devices, voice or optical recognition devices, or any other devices suitable for entering or accessing data by one or more computer systems 1000. Multiple input/output devices 1012 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1010.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An image sensor, comprising:
   a plurality of pixel circuits configured to generate analog signals based on photoelectrons accumulated by the pixel circuits when exposed to light, wherein at least one pixel circuit includes a conversion gain selection circuit configured to switch an analog signal output of the at least one pixel circuit between a first conversion gain analog signal and a second conversion gain analog signal;
   a readout circuit coupled to the output of the at least one pixel circuit, wherein the readout circuit is configured to convert the analog signal output received from the at least one pixel circuit to digital singal;
      wherein the readout circuit is configured to switch between a first readout mode and a second readout mode;
      wherein, in the first readout mode, the readout circuit outputs a digital reset value and a first digital signal value for the digital signal; and
      wherein, in the second readout mode, the readout circuit outputs a second digital signal value for the digital signal.

2. The image sensor of claim 1, wherein the readout circuit is configured to:
   operate in the first readout mode when the output of the at least one pixel circuit is the first conversion gain analog signal; and
   operate in the second readout mode when the output of the at least one pixel circuit is the second conversion gain analog signal.

3. The image sensor of claim 2, wherein the at least one pixel circuit includes:
   a photodiode configured to accumulate the photoelectrons; and
   a floating diffusion node configured to generate the analog signal output of the at least one pixel circuit;
   wherein the first digital signal value corresponds to a value of the first conversion gain analog signal when photoelectrons are transferred from the photodiode to the floating diffusion node; and
   the digital reset value corresponds to a value of the first conversion gain analog signal when photoelectrons are not transferred from the photodiode to the floating diffusion node.

4. The image sensor of claim 3, wherein the second digital signal value corresponds to a value of the second conversion gain analog signal when photoelectrons are transferred from the photodiode to the floating diffusion node.

5. The image sensor of claim 1, wherein the readout circuit includes an amplifier circuit configured to amplify the analog signal output received from the at least one pixel circuit, wherein the amplifier circuit is configured to switch an input of the amplifier circuit between a first gain path for the first readout mode and a second gain path for the second readout mode.

6. The image sensor of claim 5, wherein the first gain path applies a gain of more than 1 to the analog signal output received from the at least one pixel circuit, and wherein the second gain path applies a gain of 1 to the analog signal output received from the at least one pixel circuit.

7. The image sensor of claim 1, wherein the readout circuit is configured to convert the analog signal output to the digital signal through multiple readout of the analog signal output during the first readout mode.

8. The image sensor of claim 1, wherein the readout circuit is configured to convert the analog signal output to the digital signal through a single sample of the analog signal output during the second readout mode.

9. The image sensor of claim 5, wherein the readout circuit is configured to reset an amplifier level of the amplifier circuit when switching between the first readout mode and the second readout mode.

10. A system, comprising:
one or more lenses; and
an image sensor configured to receive light that has passed through the lenses to reach the image sensor, comprising:
a plurality of pixel circuits configured to generate analog signals based on photoelectrons accumulated by the pixel circuits when exposed to light, wherein at least one pixel circuit includes a conversion gain selection circuit configured to switch an analog signal output of the at least one pixel between a first conversion gain analog signal and a second conversion gain analog signal;
a readout circuit coupled to the output of the at least one pixel circuit, wherein the readout circuit is configured to convert the analog signal output from the at least one pixel circuit to a digital signal;
wherein the readout circuit is configured to switch between a first readout mode and a second readout mode;
wherein, in the first readout mode, the readout circuit receives the first conversion gain analog signal and outputs a digital reset value and a first digital signal value for the digital signal; and
wherein, in the second readout mode, the readout circuit receives the second conversion gain analog signal and outputs a second digital signal value for the digital signal.

11. The image sensor of claim 10, wherein:
the digital reset value corresponds to a reset value of the first conversion gain analog signal and the first digital signal value corresponds to a signal value of the first conversion gain analog signal; and
the second digital signal value corresponds to a signal value of the second conversion gain analog signal.

12. The image sensor of claim 11, wherein the at least one pixel circuit includes:
a photodiode configured to accumulate the photoelectrons; and
a floating diffusion node configured to generate the analog signal output of the at least one pixel circuit;

wherein the signal value of the first conversion gain analog signal is received when photoelectrons are transferred from the photodiode to the floating diffusion node; and
the reset value of the first conversion gain analog signal is received when photoelectrons are not transferred from the photodiode to the floating diffusion node.

13. The image sensor of claim 12, wherein the signal value of the second conversion gain analog signal occurs when photoelectrons are transferred from the photodiode to the floating diffusion node.

14. The image sensor of claim 10, wherein the image sensor is implemented using one or more integrated circuits on a semiconductor die.

15. The image sensor of claim 10, wherein the image sensor is a CMOS (complementary metal-oxide semiconductor) image sensor.

16. A method, comprising:
accumulating, in a photodiode of at least one pixel on an image sensor, photoelectrons in response to the at least one pixel being exposed to light, wherein the at least one pixel is a dual conversion gain pixel capable of switching analog signal output between a first conversion gain analog signal output and a second conversion gain analog signal output;
providing, by the at least one pixel, the first conversion gain analog signal output with a reset value;
converting, by a readout circuit coupled to the at least one pixel, the reset value to a digital reset value;
providing, by the at least one pixel, the first conversion gain analog signal output with a first signal value;
converting, by the readout circuit, the first signal value to a first digital signal value;
providing, by the at least one pixel, the second conversion gain analog signal output with a second signal value; and
converting, by the readout circuit, the second signal value to a second digital signal value.

17. The method of claim 16, wherein:
the first conversion gain analog signal output has the reset value when none of the accumulated photoelectrons are transferred from the photodiode to a floating diffusion node of the at least one pixel;
the first conversion gain analog signal output has the first signal value when a first portion of the accumulated photoelectrons in the photodiode are transferred from the photodiode to the floating diffusion node of the at least one pixel; and
the second conversion gain analog signal output has the second signal value when a second portion of the accumulated photoelectrons in the photodiode are transferred from the photodiode to the floating diffusion node of the at least one pixel, wherein the second portion is at least some remainder of the accumulated photoelectrons in the photodiode after the first portion is transferred from the photodiode.

18. The method of claim 17, further comprising resetting the floating diffusion node after converting the second signal value to the second digital signal value.

19. The method of claim 16, wherein:
the readout circuit converts the reset value to the digital reset value and the first signal value to the first digital signal value using multiple readout of the first conversion gain analog signal output; and
the readout circuit converts the second signal value to the second digital signal value using a single sample of the second conversion gain analog signal output.

20. The method of claim 19, further comprising subtracting the digital reset value from the first digital signal value to determine a final first digital signal value of the at least one pixel.

\* \* \* \* \*